US011704398B1

(12) United States Patent
Tougas et al.

(10) Patent No.: US 11,704,398 B1
(45) Date of Patent: Jul. 18, 2023

(54) REAL-WORLD OBJECT-BASED IMAGE AUTHENTICATION METHOD AND SYSTEM

(71) Applicant: UIPCO, LLC, San Antonio, TX (US)

(72) Inventors: Brian Tougas, Spring Branch, TX (US); William Daniel Farmer, Carrollton, TX (US); Ruthie D. Lyle, Durham, NC (US); Kelly Q. Baker, San Antonio, TX (US); Ryan Thomas Russell, The Colony, TX (US); Noe Alberto Martinez, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 130 days.

(21) Appl. No.: 17/317,046

(22) Filed: May 11, 2021

Related U.S. Application Data

(60) Provisional application No. 63/022,812, filed on May 11, 2020.

(51) Int. Cl.
*G06F 21/33* (2013.01)
*H04L 12/18* (2006.01)
*G06F 21/36* (2013.01)
*G06V 10/44* (2022.01)

(52) U.S. Cl.
CPC .............. *G06F 21/33* (2013.01); *G06F 21/36* (2013.01); *G06V 10/443* (2022.01); *H04L 12/1822* (2013.01)

(58) Field of Classification Search
CPC ....... G06F 21/33; G06F 21/36; G06V 10/443; H04L 12/1822
USPC .............................................................. 726/9
See application file for complete search history.

(56) References Cited

U.S. PATENT DOCUMENTS

| 2008/0226130 | A1* | 9/2008 | Kansal .................. G06F 16/583 |
| | | | 382/106 |
| 2014/0143860 | A1* | 5/2014 | Druckman .............. G06F 21/32 |
| | | | 726/19 |
| 2019/0065895 | A1* | 2/2019 | Wang ...................... G06T 7/246 |
| 2019/0156009 | A1* | 5/2019 | Maresh ................... G06F 21/36 |
| 2022/0406155 | A1* | 12/2022 | Doogan ................ G06V 10/62 |

\* cited by examiner

*Primary Examiner* — Jacob Lipman
(74) *Attorney, Agent, or Firm* — Plumsea Law Group, LLC

(57) ABSTRACT

A real-world object-based method and system of performing an authentication of a person in order to permit access to a secured resource is disclosed. The system and method are configured to collect image data from an end-user in real-time that includes objects in their environment. At least one object is selected and its image data stored for subsequent authentication sessions, when the system can determine whether there is a match between the new image data and image data previously collected and stored in a database. If there is a match, the system verifies an identity of the person and can further be configured to automatically grant the person access to one or more services, features, or information for which he or she is authorized.

20 Claims, 11 Drawing Sheets

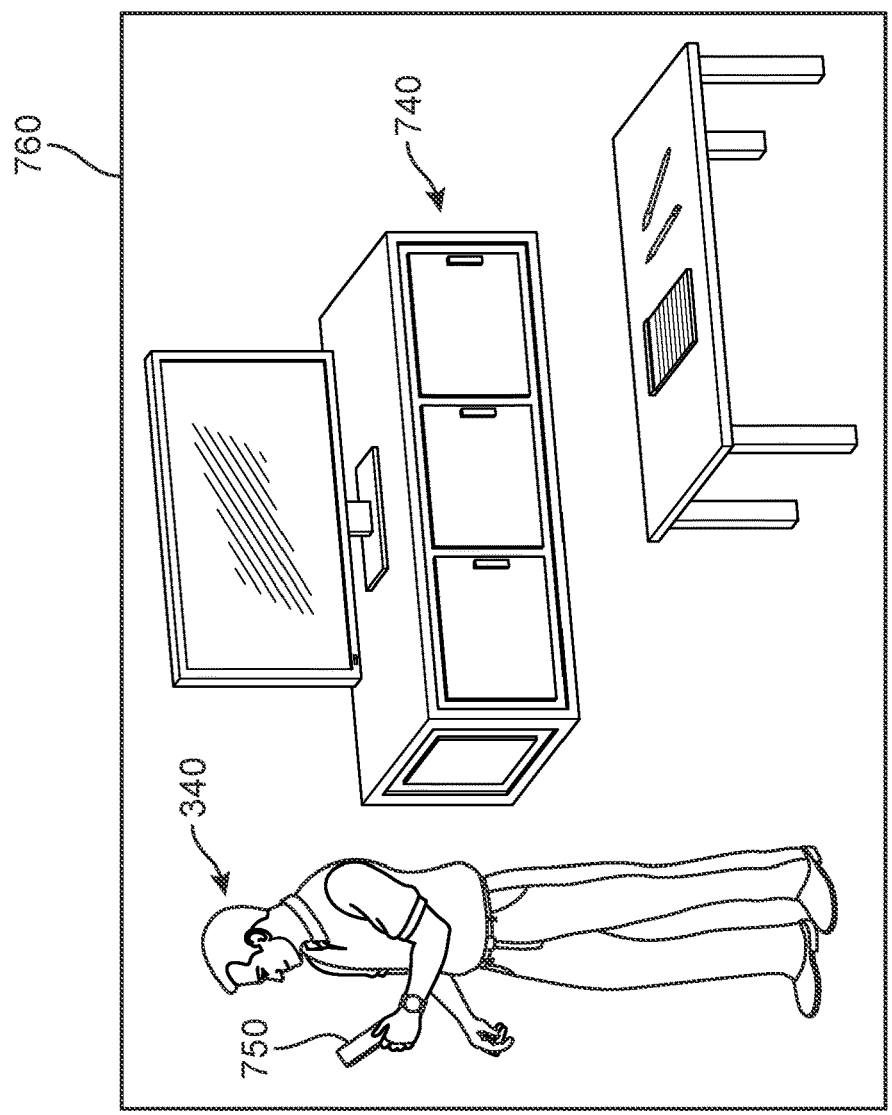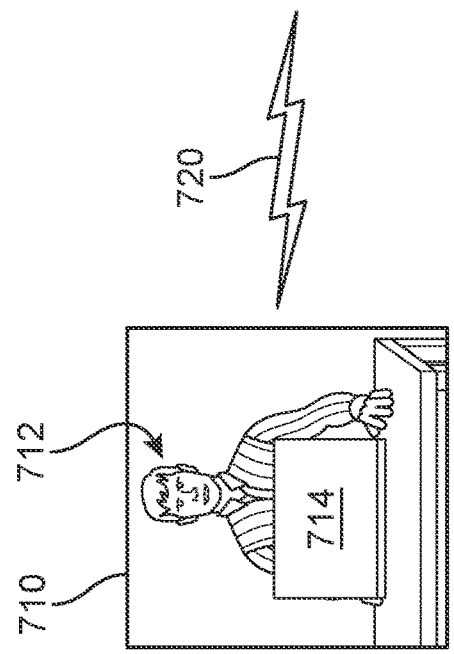
FIG. 7

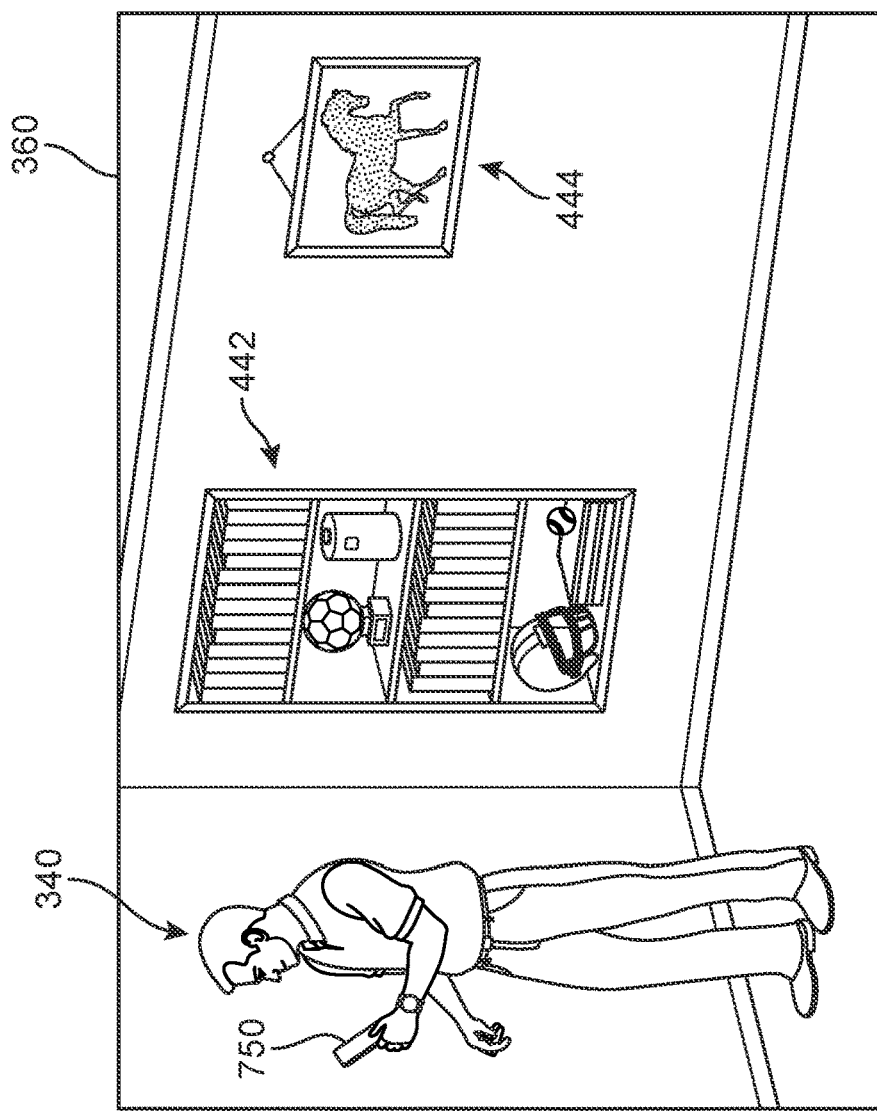
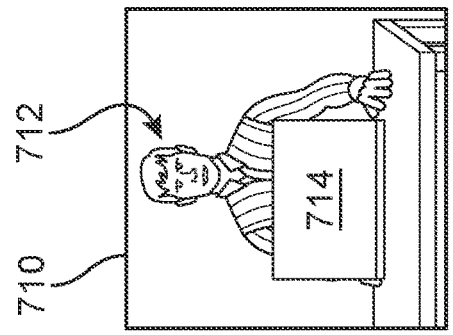
FIG. 8

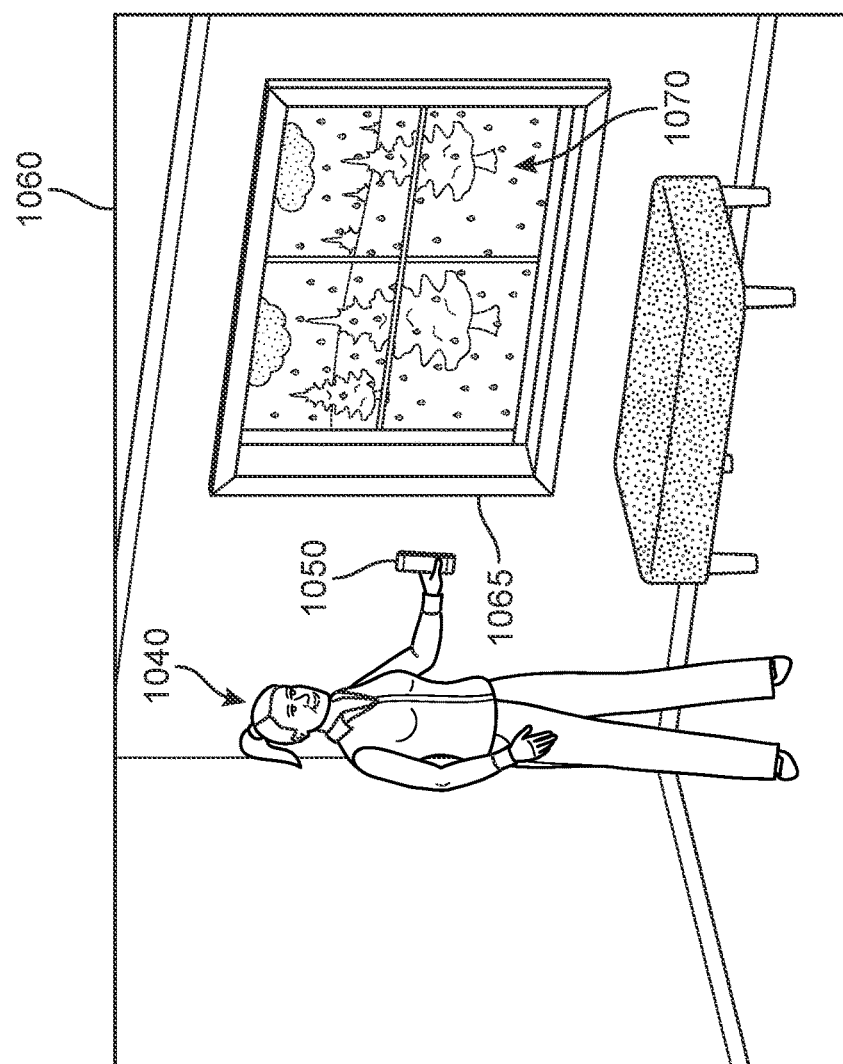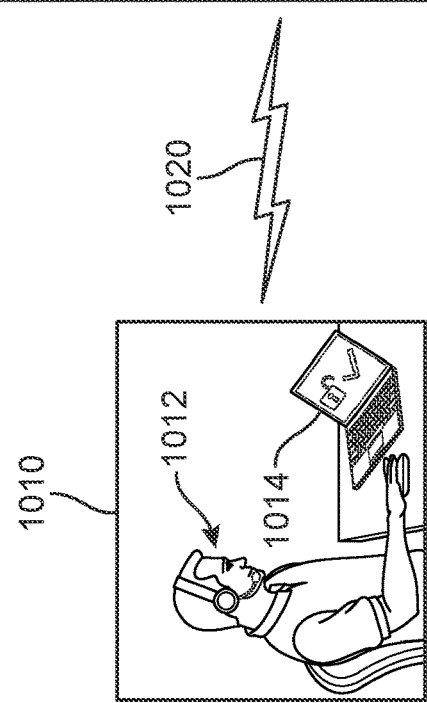
FIG. 10

REAL-WORLD OBJECT-BASED IMAGE AUTHENTICATION METHOD AND SYSTEM

CROSS-REFERENCE TO RELATED APPLICATION

This application claims the benefit of U.S. Provisional Patent Application Ser. No. 63/022,812 filed on May 11, 2020 and titled "Real-World Object-Based Image Authentication Method and System", the disclosure of which is incorporated by reference in its entirety.

TECHNICAL FIELD

The present disclosure generally relates to identity authentication, and specifically to a method and system for authentication of persons seeking access to one or more secured services, features, and resources. The authentication is based on an item or visual cue known to be in the physical environment occupied by the person.

BACKGROUND

Organizations may provide authorized end-users with various secured services or resources via multiple communication channels. Examples of such channels include modes of communication (e.g., a communications network) for exchanging data between devices, where such devices may include, but are not limited to, computing devices, such as tablets, personal computers, and smartphones; point of sale devices; ATMs; connected smart devices, such as refrigerators, watches, and laptops; telephones, such as landline telephones or mobile phones; electronically locked spaces managed by computer user interfaces, such as safe deposit box chambers, lockers, cars, offices, homes; and face-to-face contacts, such as interaction between a user and an employee of the organization. Channels may also include software and firmware associated with the devices and communications devices, such as web portals, applications, networks, mobile applications, and instant messaging systems. Channels may also include hardware associated with the computing devices and telephones, such as the network hardware, credit card scanners, and retinal scanners.

In most scenarios in which an end-user attempts to access a secured resource via one or more of these channels, the end-user will be required to provide some proof of identity, typically associated with an identification card, key-card, fingerprint, or other factor before access is granted. Personal computers (computing devices) pose additional complexities in authenticating users. Computing devices are commonly used by more than one person. It is generally not safe to assume that the identity of the computing device satisfies the ownership factor. Additionally, computing devices have been more easily compromised than other devices. Current solutions increase security, but are often inconvenient for users.

Thus, authentication (i.e., identifying and verifying) of an end-user can be time-consuming for both the end-user and the organization, as well as burdensome for users who are required to carry and present the necessary identification credentials and/or keys, or memorization of passwords or codes. It may be appreciated that many businesses and other organizations would benefit from mechanisms by which to reduce the costs associated with the authentication and authorization of customers. Furthermore, customers will be attracted by an authentication system that reduces or even eliminates the need to carry or remember multiple unique identification factors, as well as a system that significantly improves account security.

There is a need in the art for a system and method that addresses the shortcomings discussed above.

SUMMARY

In one aspect, a method of authenticating an identity of an individual is disclosed. The method includes obtaining first image data at a first time from a first computing device associated with a first user, the first image data including a virtual representation of a first real-world object that is located in proximity to the first user, and then accessing a first set of one or more records stored in a database, where each record of the first set includes stored image data linked to a first user identity. The method further includes determining that the first image data matches second image data of a first record of the plurality of records, the second image data being linked to the first user identity. In addition, the method includes determining, in response to the first image data matching the second image data, that the first person has the first user identity, and thereby authenticating the first person for access to a first secured resource for which the first user identity is authorized.

In another aspect, a system for authenticating an identity of an individual includes a processor and machine-readable media. The machine-readable media include instructions which, when executed by the processor, cause the processor to obtain first image data at a first time from a first computing device associated with a first user, the first image data including a virtual representation of a first real-world object that is located in proximity to the first user. In addition, the instructions cause the processor to access a first set of one or more records stored in a database, where each record of the first set includes stored image data linked to a first user identity. The instructions also cause the processor to determine that the first image data matches second image data of a first record of the plurality of records, where the second image data is linked to the first user identity. Furthermore, the instructions cause the processor to determine, in response to the first image data matching the second image data, that the first person has the first user identity, and thereby authenticate the first person for access to a first secured resource for which the first user identity is authorized.

In another aspect, a system for authenticating an identity of an individual includes means for obtaining first image data at a first time from a first computing device associated with a first user, the first image data including a virtual representation of a first real-world object that is located in proximity to the first user, as well as means for accessing a first set of one or more records stored in a database, wherein each record of the first set includes stored image data linked to a first user identity. The system further includes means for determining that the first image data matches second image data of a first record of the plurality of records, the second image data being linked to the first user identity. In addition, the system includes means for determining, in response to the first image data matching the second image data, that the first person has the first user identity, as well as means for authenticating the first person for access to a first secured resource for which the first user identity is authorized.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 7 is an illustration of a person engaged in a video communication session with a service representative while in a first physical space, according to an embodiment;

FIG. 8 is an illustration of the person of FIG. 7 having moved to a second physical space in which the appropriate object corresponding to the object token is located, according to an embodiment;

FIG. 10 is an example of an end-user being authenticated based on the external weather conditions matching the expected weather conditions for her location, according to an embodiment.

DETAILED DESCRIPTION

Figure 1:
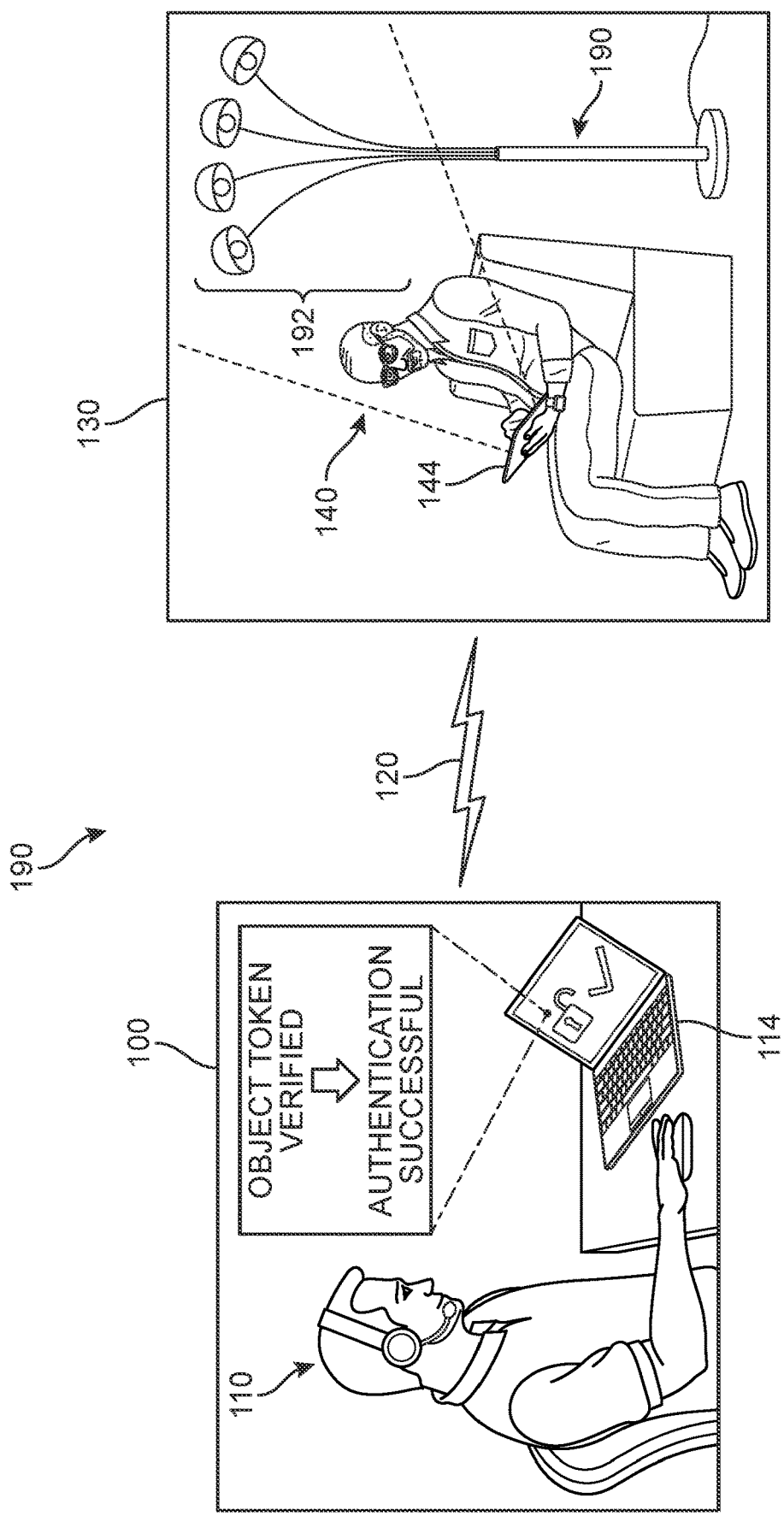
FIG. 1 is an overview of a scenario in which a person provides image data for the appropriate object token and obtains access to a secured resource, according to an embodiment.

The embodiments provide a method and system allowing users to be authenticated in a more secure and more efficient manner. As described in greater detail below, an authentication process and system based on environmental objects or cues may be utilized for reducing and in some cases eliminating the need for users to present credentials, input passwords, or otherwise offer identity tokens or factors. The proposed system takes advantage of the increasing reliance on teleconferencing and the growing availability of image sensors with computing devices in the day-to-day life of the modern consumer. By capturing and storing selected information or visual cues about the normal environment associated with a specific user, subsequent user service sessions can be securely authenticated by reference to the same selected visual cues. For example, such authentication can be performed by confirming that an expected object in the background of the user is present prior to permitting access to a secure resource.

Such an approach can be advantageous in combating the growing threat of video forgery. Deep fake algorithms in particular are becoming increasingly sophisticated. By generating a face through a deep learning neural network, such algorithms are able to replace a real face with an imposter fake face in real time. Such algorithms can be implemented using both Artificial Intelligence (AI) and Machine Learning (ML) to 'trick' a secured system into releasing confidential information. While existing technologies allow digital watermarks to be added to images, videos, and audio files or streams to ensure the authenticity of distributed media, the use of such technologies is typically controlled by producers of the media rather than by a speaker within a video. As will be discussed below, the proposed systems can further be configured to verify a user's identity with minimal user effort and offer a simplified, efficient, and ultimately highly convenient process by which to authorize and grant the user access to secured resources. Such systems can rely on device infrastructure that is already in place for video and image recording, making it simple to deploy at a low cost.

References to various aspects of access management will be discussed throughout the following disclosure, including identification, authentication, and authorization. For purposes of this application, the term 'identification' refers to the process of associating a user with something that has occurred on a server, on a network, or with some other resource, and typically occurs when a user (or any subject) claims or professes an identity. Traditionally, the process of identification can be accomplished with a username, a process ID, a smart card, or anything else that can uniquely identify a subject. In addition, the term authentication refers to the process of proving (or verifying) an identity, and typically occurs when subjects provide appropriate credentials to prove their identity. For example, when a user provides the correct password with a username, the password proves that the user is the owner of the username. Thus, the authentication provides proof of a claimed identity. As a general matter, three main methods of authentication include (a) user knowledge, such as a password or PIN; (b) user possession, typically provided by the secured system, such as a key, smart card, CAC (Common Access Card), PIV card (Personal Identity Verification card), RSA, or other card or token, magnetic stripe cards, certificates with a digital signature, etc.; and (c) biometric factors, such as voice recognition, retinal and fingerprint scans, etc.

Authorization refers to the concept of allowing access to resources only to those permitted to use them. In other words, authorization is a process that protects resources by only allowing access by consumers that have been granted authority to use or receive them. Some examples of such resources include individual files' or items' data, computer programs, computer devices and functionality provided by computer applications, as well as more tangible resources such as ATMs, banks, vaults, offices, or other spaces with specific security requirements. In addition, the use of the term "secured resources" refers to services, features, or other resources (physical and digital or virtual) that are access-restricted and are designed to be made available only to users that have been authenticated and authorized for such access. The term "passive" refers to the concept of a system and method that is not dependent on any particular 'active' interaction of a person with a device resulting from a change in the person's normal activity or behavior. In other words, walking and moving from one location to another are passive interactions, as the person would perform these activities regardless of the authentication system that is in place. However, other user actions, such as but not limited to providing a voice command, passcode, retinal scan, carrying and presenting an identification credential or token, fingerprint scan, etc. are active inputs and a system requiring any of these types of information would not be considered passive.

Organizations and businesses often provide support to customers by making available to their customers one or more member service representatives (MSRs) or other customer representatives and service agents (referred to generally herein as "agents") who have access to networked computers, telephones, often networked to a larger corporate computer network, including mainframes, microcomputers and LANs. For example, voice and data pathways into the center can be linked through routing servers and computer telephony integration (CTI). In some cases, CTI also facilitates interfaces with customer support servers in addition to any e-mail system, databases and web-based services. A customer may contact or be contacted by an MSR to learn more about a service or product, obtain guidance, or purchase various items. Implementations of the proposed systems and methods may also include interactions with an agent, virtual or human, of a secured system. This service representative or agent is stationed at a location that is remote relative to the customer's location, such as a call center. As used herein, the term "customer" or "user" should be understood tor refer to any end-user or person requesting or receiving assistance or other communications from a secured system, including via a communication session with a remote agent. The customer can view at least one aspect of the interaction through a display of their computing device.

It may be appreciated that conventional methods of authentication rely heavily on identification documents or other tangible items provided by the system administrators that users are required to carry on their person and present when prompted, and/or intangible factors such as memorized passcodes or security questions and answers. However, such tokens have significant shortcomings. For example, they can be lost, stolen, or forged. In many cases, an individual may need to carry multiple identification cards or tokens, which may be unwieldy. Furthermore, less tangible factors can be burdensome, requiring memorization or physical contact or a particular physical position or proximity with a device. The following systems describe a process of authentication that does not rely on such factors, and serves as a barrier to deep fake imposter attacks.

For purposes of introduction, an overview of one embodiment of the proposed systems and methods is illustrated with reference to FIG. 1. In FIG. 1, an example of an environment 190 designed with the goal of reliably authenticating a person is depicted. The environment 190 is arranged such that a person can obtain access to secured resources to which they have been granted authorization. In this example, an access management system is configured to passively verify an identify of a person so as to either permit or deny access to the user-identity dependent services provided by a first service representative ("first agent") 112 located at a remote site 100.

In addition, a first user 140 is shown with a first computing device ("first device") 144 and is seated on a sofa in a first physical space 130. The first device 144 can include an electronics unit comprising a plurality of different components, such as a user interface component (e.g., a touch-screen display, keyboard, mouse, microphone, etc.), a sensor unit (including one or more cameras or other image-based sensors), a user interface module, a processor, and/or a communication module. In some embodiments, the first device 144 may also include a microphone and speaker. In this example, first device 144 is a computer tablet.

Thus, the first device 144 may include a system including one or more processors and memory. Memory may comprise a non-transitory computer readable medium. Instructions stored within memory may be executed by the one or more processors. The first device 144 may be configured to receive and analyze data from various sensors associated with the sensor unit in the first device 144 or data that is communicated from external components or devices to first device 144. In different examples, the sensor unit includes a variety of sensors. The sensors can include one or more of an image sensor, a light sensor, a microphone, a speaker, a touch-sensitive sensor, among others. In some cases, the first device 144 may also include a navigation system equipped with a GPS receiver that can receive GPS information or other receivers capable of receiving global or local positioning information.

A communication module may allow the first device 144 to communicate wirelessly. In this case, the communication module is illustrated as a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In FIG. 1, the first user 140 is able use first device 144 to capture and transmit views of real-world objects in the environment of first physical space 130 around him or her. The first physical space 130 can refer to any physical environment such as a room in an office, residence, or other building, as well as open or outdoor spaces. In this case, the first physical space 130 is a room of a residence, such as a bedroom. During this time, the first user 140 is also engaged in a communication session with the first agent 112 who is located outside of the first physical space 130, for example, at a support center location. The first agent 112 is equipped with a second computing device ("second device") 114 through which he is able to send data to and receive data from first user 140 across a network 120. In this encounter, the first agent 112 utilizes the communication support software available through her second device 114 to view images captured by cameras associated with first device 144 at first physical space 130.

In this example, it is to be understood that at a time prior to the current communication session between first user 140 and the first agent 112, the first user 140 provided information about his or her environment and a specific object that is disposed in that environment (e.g., via an enrollment process as depicted in FIGS. 3-6). This object was scanned, stored, and selected as the first user's "object token". For purposes of this application, an object token refers to a physical object that is associated with the normal environment of a user and whose presence when detected serves to indicate or support the user's claimed identity. The object token selected for a particular user can thus vary widely and essentially can refer to any item that may be viewed by an image sensor linked to the user's computing device. In this example, a first object token ("first object") 192 is an upper portion of a floor lamp 190 situated directly behind the first user 140. It should be understood that an object token may not be unique (e.g., various objects of the same type can be found in multiple user households), but due to its being selected and linked to the specific user and later is found to be detected in the proximity of the user, such objects can nevertheless serve as secure, reliable authentication factors.

In different embodiments, the access management system processes the image data and a set of features are extracted that will be matched with feature sets that had been previously captured and stored in a secure database linked to the user's account. Once a match between the current image and the image of the stored object token is detected, the user's identity can be verified. In this example, an image of the first object 192 is received by the system and compared to the record of the object token previously assigned to or selected by first user 140. A match between the two sources is detected, and the system automatically communicates this information to the first agent 112. In some embodiments, the system can also automatically determine based on account information for the first user 140—that first user 140 is authorized to access her account information and/or services. Thus, in FIG. 1, without further action or presentation of credentials by first user 140, the communication session can proceed with permitting first user 140 with access to the account linked to the authenticated identity of the first user 140. The first user 140 is then able to make account requests and/or receive sensitive account information.

While in some embodiments the system may incorporate additional layers of authentication that may supplement the authentication process associated with the object token, such as facial recognition, voice recognition, fingerprint recognition, password or pin-code verification, or other such factors, it may be appreciated that the system can be readily implemented without such additional steps. In other words, the first user 140 is able to obtain access to the desired secured resources without an identification card, debit card, or other system-provided token typically presented for such occasions. The system thereby allows the user to be passively (e.g., 'touchlessly') authenticated. In some embodiments, the system is further configured to automatically provide the user with access to the secured service linked to the user's unique account, in response to the authentication that is performed based only or primarily on the image data captured for the environment around first user 140.

Figure 2:
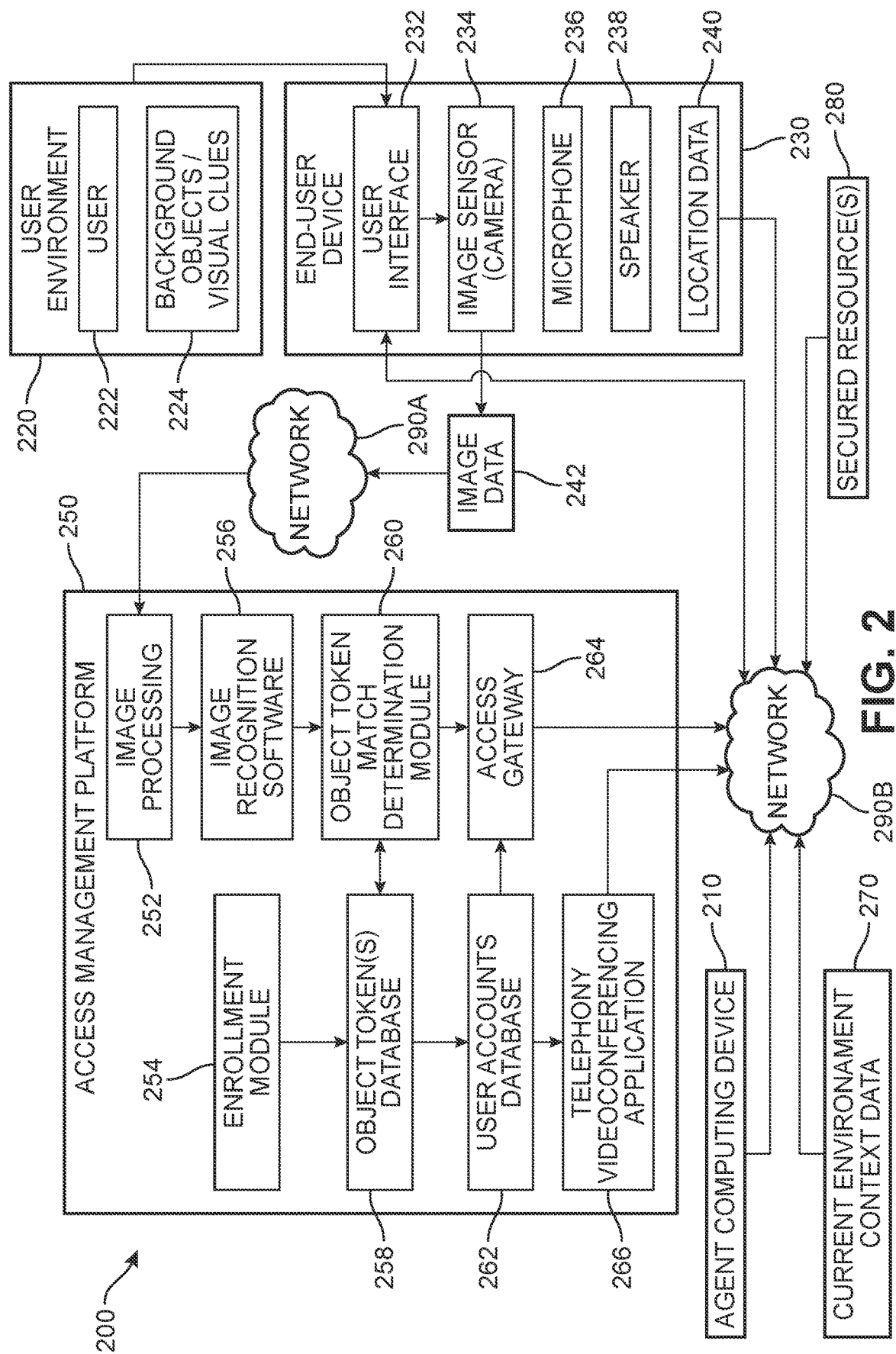
FIG. 2 is an overview of an architecture of a real-world object-based authentication system, according to an embodiment.

For purposes of clarity, an overview of a system architecture ("architecture") 200 for an embodiment of an access management system is depicted in FIG. 2. It should be understood that the architecture 200 as presented is for purposes of illustration only, and other embodiments may utilize different or additional components or processes. The architecture 200 may alternatively include additional, fewer, or different components. For example, the architecture 200 may include additional storage devices, additional servers, additional computing devices, and other features not shown in FIG. 2.

In FIG. 2, the architecture 200 can be seen to include an access management platform ("platform") 250, an end-user device ("user device") 230, and an optional agent computing device ("agent device") 210. Devices and components of architecture 200 can communicate with each other and with other components of architecture 200 over one or more networks (shown here as 290A and 290B, and referred to collectively as 290). The networks 290 may comprise any number of electronic devices and use any number of communication protocols to facilitate data communications within the network 290. One having skill in the art would appreciate that the network 290 may include a variety of internal and/or external networks 290 of various types implementing various data communications technologies. The communication over the network may be performed in accordance with various communication protocols such as Transmission Control Protocol and Internet Protocol (TCP/IP), User Datagram Protocol (UDP), and IEEE communication protocols. The networks 290 can include a wireless (e.g., Wi-Fi, Bluetooth®) or wired data network, a cellular network, a telecommunications network, an enterprise network, an application-specific public network, a Local Area Network (LAN), a Wide Area Network (WAN), WLAN, MAN, a private network, a public network such as the Internet, an ad-hoc network, a network that includes a satellite link, or another type of data communication network. The network 290 may include a physical and/or logical architecture defined by firewalls, proxy servers, routers, switches, or similar features that implement various levels of security and my function as logical gateways or boundaries.

It can be seen in FIG. 2 that agent device 210, user device 230, and platform 250 can be configured to work in conjunction with a telephony/videoconferencing application ("application") 266 such as a telephone connection or teleconferencing software application. For example, implementations described herein may be performed via any electronic communications between an agent and a customer including, but not limited to, telephone, video telephone, chat (e.g., IM, Slack™, Jabber™), video chat (e.g., Skype™, MS Teams™, Zoom™, Facetime™) internet based meetings (e.g., WebEx™), custom call-center systems, and other conference call systems. In addition, application 266 can be configured to present various interfaces by which administrator or other users can interact with features of platform 250.

In different embodiments, the platform 250 is capable of communicating with external devices such as agent device 210 (also referred to herein as an administrator computer) and the user device 230 (also referred to herein as the image capture device) through the network 290 using wired or wireless communication capabilities. The platform 250 can be understood to comprise a server and, along with the agent device 210, may include computing devices comprising any number of components, such as a Network Interface Card (NIC), allowing the respective devices to receive, transmit, process, and store information obtained from the image capture devices. In other words, the architecture 200 may include groups or subgroups of computing devices that can communicate with each other, but not necessarily with the computing devices in other groups or subgroups. The architecture 200 may include computing devices of disparate types, having different types of hardware and software configurations and in a variety of different locations. In some cases, multiple devices or subsystems can be identified together as a single computing device.

The platform 250, agent device 210, and user device 230 may include one or more processors, non-transitory machine-readable storage media, and a data communication interface (e.g., NIC card), as well as user interface devices, for example, a monitor, touchscreen, mouse, or keyboard. These components can be implemented as computing devices or mobile devices, such as smart phones, personal digital assistants (PDAs), portable media players, watches, glasses, laptops, notebooks, tablets, and others, and can include work stations, mainframes, non-portable computing systems, devices installed in structures, vehicles, and other types of installations.

In different embodiments, the platform 250 includes or is configured to access one or more databases, such as member profile or user accounts database 262, and an object token(s) database 258. The user accounts database 262 is a content library that stores account data related to one or more users. The data may include, for a plurality of users, name, personal and professional details, current and past policy for the user, credit limit of users, among other details. The object token(s) database 258 stores image data in which objects—represented virtually or digitally—may be recognized and/or tagged in videos, still images, or both (referred to collectively as image content). In one embodiment, each image content has associated metadata, such as keywords, tags, or a textual description of the image content. In some embodiments, the object token(s) database 258 may store pre-stored image patterns and executable files associated with one or more computer vision applications (e.g., OpenCV). A computing device may execute a computer vision application that may identify the objects captured in the image content.

As will be described in greater detail below, in some embodiments, an end-user may enroll with the access management platform 250 and register a specific object token. For example, a user 222 may, via user device 230, interact with aspects and features provided by platform 250. Some non-limiting examples of user device 230 include computing devices with an internal or external camera, a portable computational device (e.g., cell phone, PDA, laptop, palm-top or web pad-like device with an internal or external camera), a smart watch, smart glasses, or the like. The user device 230 thus can be understood to include image capture functionality and have connectivity to at least one network such as a cellular telephone network and/or the Internet. A camera 234 of or connected to the user device 230 is configured to capture video or frame data representative of a period of time in a scene, such as an aspect of user environment 220 that can include either or both of the user 220 and background objects or visual cues 234 near the user 220. The video is a series of frames and associated timing information. The term video as used herein refers to both a video display (i.e., the display of streamed frames) and also to video data (i.e., the digital information which may be stored or used to produce a video display). Non-limiting examples of videos include files in MP4 or QuickTime format. The frame may be a single complete still image in a sequence of images that creates the illusion of motion within a scene when displayed in rapid succession (streamed). The frame may be used to refer to digital information representative of the single still image. The frames within a video may be associated with a brief period of time equal to 1/fps. The term 'fps' is an abbreviation for frames per second. Hereinafter, the term "still image" and "frame" may be used interchangeably. Examples of frames include files in Joint Photographic Experts Group (JPEG), Tagged Image File Format (TIFF), Graphics Interchange Format (GIF), Windows bitmap (BMP), or Portable Network Graphics (PNG) formats.

The user device 230 may further include a microprocessor, a communication unit, random access memory (RAM), non-volatile memory, a display, one or more auxiliary input/output (I/O) devices, a data port, a keyboard, a speaker 238, a microphone 236, a short-range wireless communications subsystem, a rechargeable battery, a battery interface, and possibly other components. The user device 230 may include fewer, additional, or different features, which may be arranged and may operate in the manner shown or in a different manner. The user device 230 may communicate over wireless networks, including wireless telecommunication networks, wireless data networks, combined voice and data networks, or other types of wireless networks. The networks can include one or more local, regional, national, or global networks. The networks can include one or more cellular networks. In some implementations, wireless networks utilize one or more communication protocol standards, for example, 3G, 4G, GSM, CDMA, GPRS, EDGE, LTE or other.

In different embodiments, the camera 234 is linked to or otherwise integrated within a unit configured to capturing images of the one or more objects in user environment 220, storing images of one or more objects and/or sending image data 242 of the one or more objects for processing. The camera 234 is further capable of capturing single or multiple images or video streams of the user environment 220 and converting the single or multiple images or video streams to digital information (image data 242). The camera 234 is equipped with optical and electro-optical imaging components for capturing images.

In some embodiments, user device 230 is configured to send captured image content to remote facilities such as the platform 250 and/or the agent device 210. Image processing algorithms and/or software (see image processing 252) may be stored in user device 230, platform 250, the agent device 210, and/or other devices of architecture 200 for pre-processing and processing of the captured image data 242. In one embodiment, the image processing algorithms 252 perform compression, artifact correction, noise reduction, color corrections, geometric corrections, imager non-uniformity correction, etc., and various image processing enhancement operations on the image content captured by the camera 234 of the user device 230. The image processing algorithms are numerical and symbolic algorithms for the manipulation of images and video streams captured by the camera 234. The algorithms can be implemented as software running on a processor, DSP processor, special purpose ASIC and/or FGPA's. The image processing algorithms can also be a mixture of custom developed algorithms and libraries. The image processing algorithms can further be arranged in any logical sequence, with potential changes in the sequence of processing or parameters governing the processing determined by image type, computational requirements or outputs from other algorithms. Image processing 252 may also include machine learning techniques that can be used to discriminate between features and to identify objects, for example via image recognition and object detection software 256. Such machine learning techniques may also be stored in the agent device 210 and/or user device 230, or other devices of the architecture 200. Such techniques may also include machine vision algorithms that perform, among other operations, digit recognition, printed and handwritten text recognition, symbol, logo and watermark recognition, and general shape recognition, as well as object classification. The machine vision algorithms may reside on a different system belonging to a different entity than the image processing algorithms or the application software. The machine vision algorithms, which are applied to identify an object in the digital image, may include computer vision algorithms such as image analysis algorithms that may use a feature detector or a combination of detectors. For example, texture detectors and edge detectors known to those skilled in the art may be used. If both specific texture and specific edges are detected in a set of images, then an identification may be made. One non-limiting example of an edge detection method includes the Canny™ algorithm available in computer vision libraries such as Intel™ OpenCV. Texture detectors may use known algorithms such as texture detection algorithms provided by Matlab™. Some non-limiting examples of object detection algorithms include R-CNN, SPP, Fast R-CNN, Faster R-CNN, Feature Pyramid networks, RetinaNet (Focal loss), Yolo Framework—Yolo1, Yolo2, Yolo3, and SSD.

When a user requests access to a secured resource, for example via user interface 232 presented on user device 230 via network 290, he or she may initially submit training image data for detection and selection through an enrollment module 254 (see FIGS. 3-6). The enrollment module 254 receives data from image recognition software 252 and identifies and tags prospective object tokens that, once confirmed, will be stored in the secure object token database 258, linked to the specific user account as stored in user accounts database 262. The training data will also include information about the pose (i.e., the orientation and position) of the representation of the selected object token. Once an object token for a specific user is selected, the user account can be updated to reflect the availability of the new access mechanism for the user. Subsequent access sessions will receive new image data 242 for use by the platform 250 in order to compare the object(s) in the new image with the stored object tokens in object token database 258, via an object token match determination module 260.

For example, platform 250 can execute an object recognition protocol to identify one or more image features of the image content and then determine an identification of the object(s) in the image content based upon the one or more features of the digital image identified by the executed object recognition protocol. In some embodiments, the platform 250 can generate an object profile of the detected objects 224 based upon one or more data records of the object stored in the object token database 258 for that user account, where each respective record contains data corresponding to a valuation of the respective object. In other words, object tokens can be processed to generate a value corresponding to the image data for that object. In one embodiment, the object profile also stores member identifier data associated with the user who submitted the image content. If subsequent image data includes a substantially similar valuation, it can be determined that a match has occurred. It is important for subsequent access attempts relying on the selected object token to present or capture the object token in the same or substantially similar pose in order to ensure the value for the received object token is as close as possible to the original stored object token value. In other words, the received object token value is compared by the object token match determination module 260 with the stored object token value ("verification value"), and if a match is found or is in an acceptable range, the access to secured resource(s) 280 by the user 222 will be allowed and/or enabled by access gateway 264. Otherwise, access is denied. Thus, authentication based on knowledge of the user and the verification value strongly implies that the user that provides the object token value is in fact in possession of the item and correspondingly is in fact entitled to whatever access is being requested. It should be understood that while the platform 250 bases access decisions primarily on the detection of the designated object token, the system is further configured to first confirm that the user ID and optional password match based on information available in the user accounts database 262.

In some embodiments, architecture 200 can include components and/or features that offer additional authentication security. For example, as will be discussed below with reference to FIG. 11, the token object selected can correspond to a window or other viewing space to the external local environment. In such cases, the platform 250 and/or agent can request information for the user's current location (e.g., based on user location data 240), such as external environmental weather or other visually observable conditions. In such cases, platform 250 may include access to a current environment context data server 270 that provides real-time updates for locations around the world. In addition, location data 240 on its own can be used to supplement authentication security (i.e., the location data should match the expected location of the user or a location that the user has previously identified as his home, office, etc.).

Referring now to FIGS. 3-6, an example of an enrollment or training and record acquisition session ("enrollment session") 350 for collection of data and selection of object token(s) that may be used by some of the proposed systems is depicted. The training session 350 can, in some embodiments, be used to collect data and identify features that are present in the physical context of an individual and will then be stored in a database. In this case, a second user 340 is located in a second physical space 360 which is a home office of a residence. It should be understood that second physical space 360 can comprise any other type of space where the user resides or works or otherwise frequents, including other rooms of his or her home, meeting rooms at his or her workplace, or even a library, vehicle, outdoor space, or other place of business. However, the second physical space 360 should be chosen by the user to correspond to an environment or space that the user expects will be available to him or her during subsequent authentication sessions. While the image data collected for a specific object is tolerant to some variances in spatial location and training can therefore occur in many different environments, the training session preferably occurs in the same location and utilizes the same device arrangement as will be used for later authentication.

Figure 3:
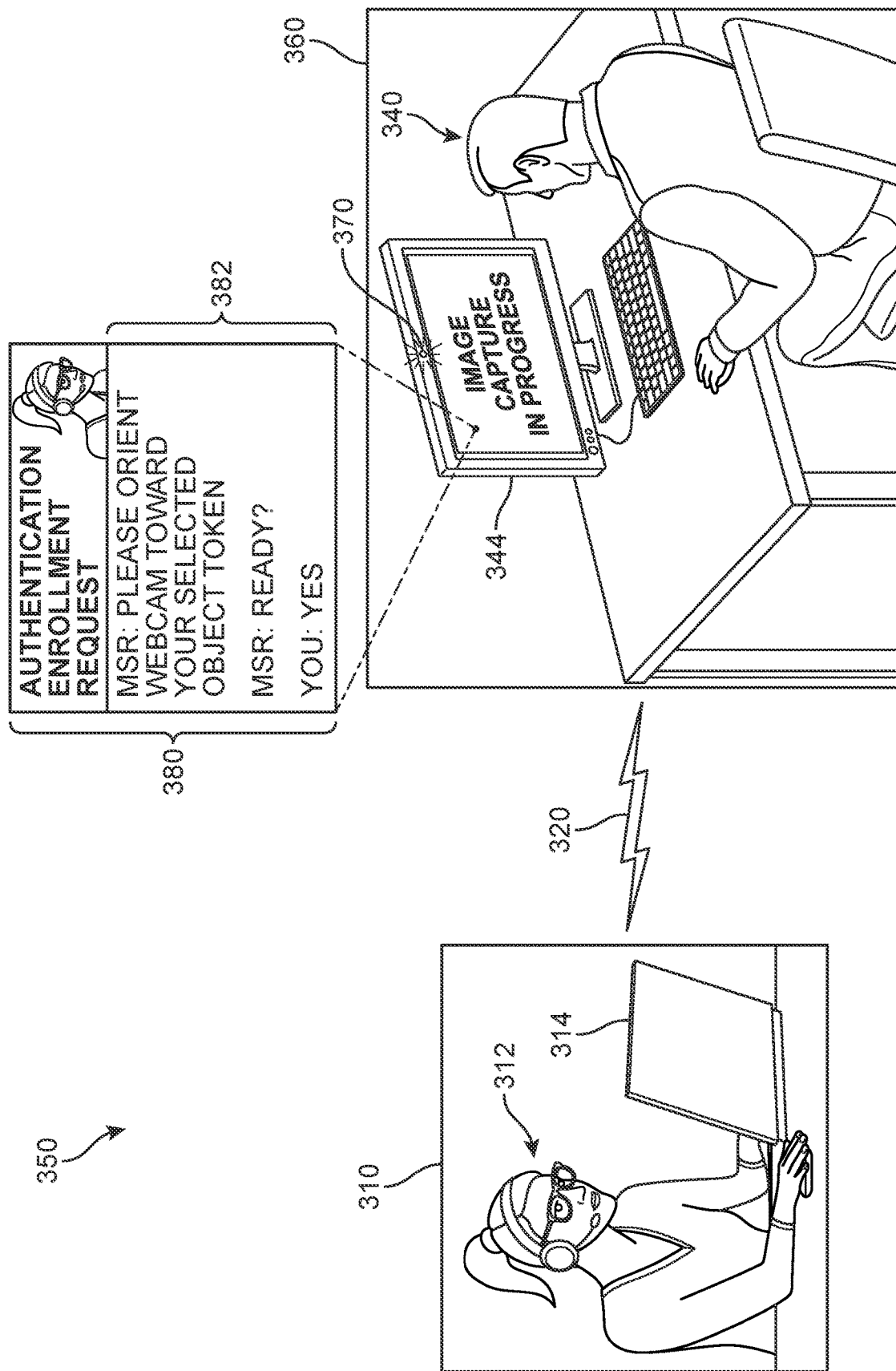
FIG. 3 depicts an example of an enrollment session of a user with a real-world object-based authentication system, according to an embodiment.

In FIG. 3, the second user 340 is, via a third computing device ("third device") 344, interacting with the access management system and communicating with a second agent 312 through a fourth computing device ("fourth device") 314 located at a remote site 310. The second user 340 has requested and/or been offered the opportunity to register an object token with his account. In this case, a first user interface ("first interface") 380 providing a first chat window 382 allows the second user 340 to partake in an instant messaging session with the second agent 312 ("Authentication Enrollment Request—MSR: Please orient webcam toward your selected object token/MSR: Ready?/YOU: Yes"). In other embodiments, the communication can occur in part or fully via a video conferencing interface whereby the second agent 312 and second user 340 speak in real-time over a video screen. Once the second user 340 provides his consent to the enrollment, an image capturing event is automatically triggered by the system or initiated by the second agent 312, and image data collected by an image sensor ("camera") 370.

Thus, in different embodiments, a user can communicate via an interface generated by an application provided by access management system. The application can offer a user interface that may be accessed via any user computing device configured for connection to a network. In different embodiments, the application can be configured to offer content via native controls presented via an interface.

Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

Figure 4:
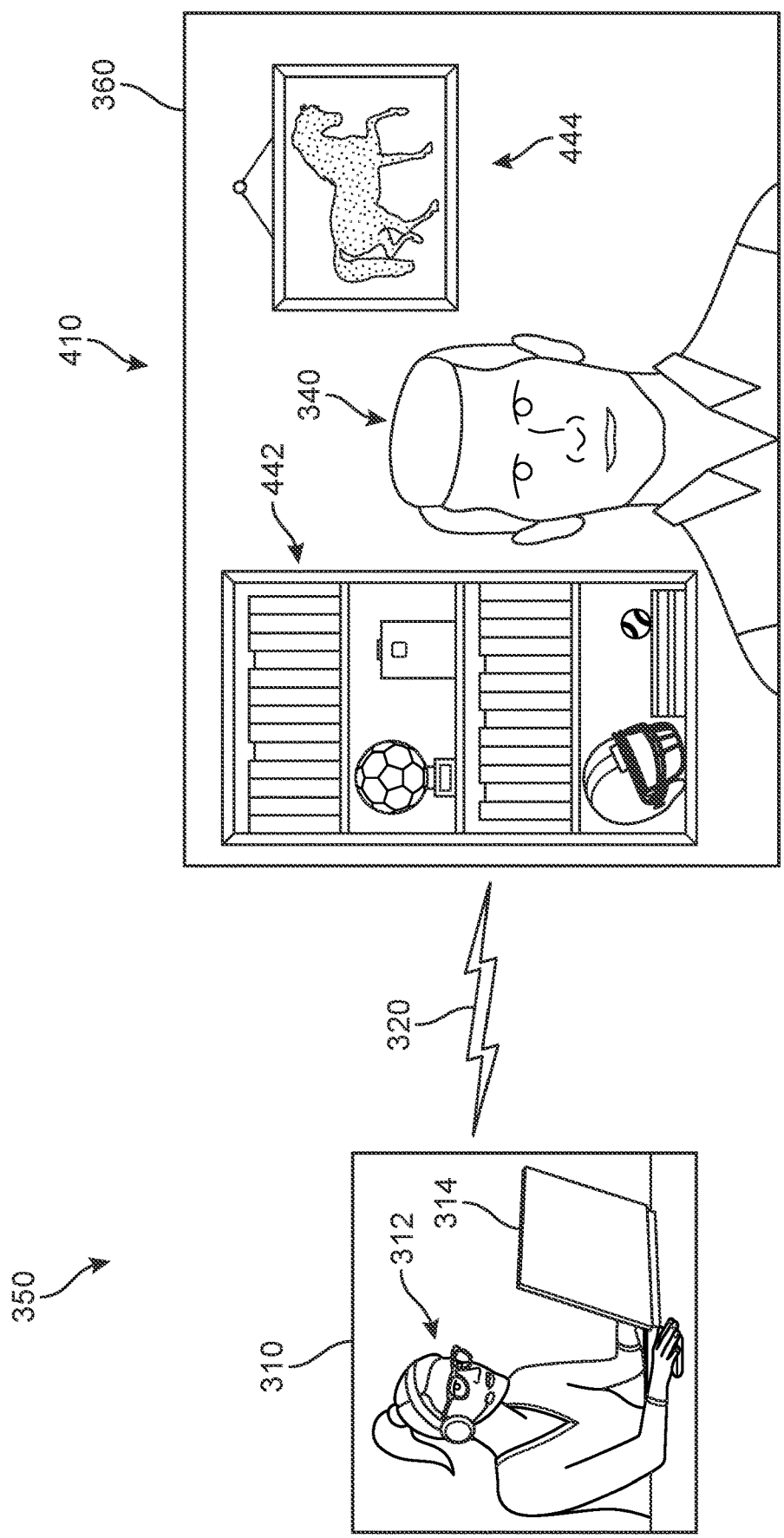
FIG. 4 depicts an example of a real-world environment associated with the user of FIG. 3, according to an embodiment.
Figure 5:
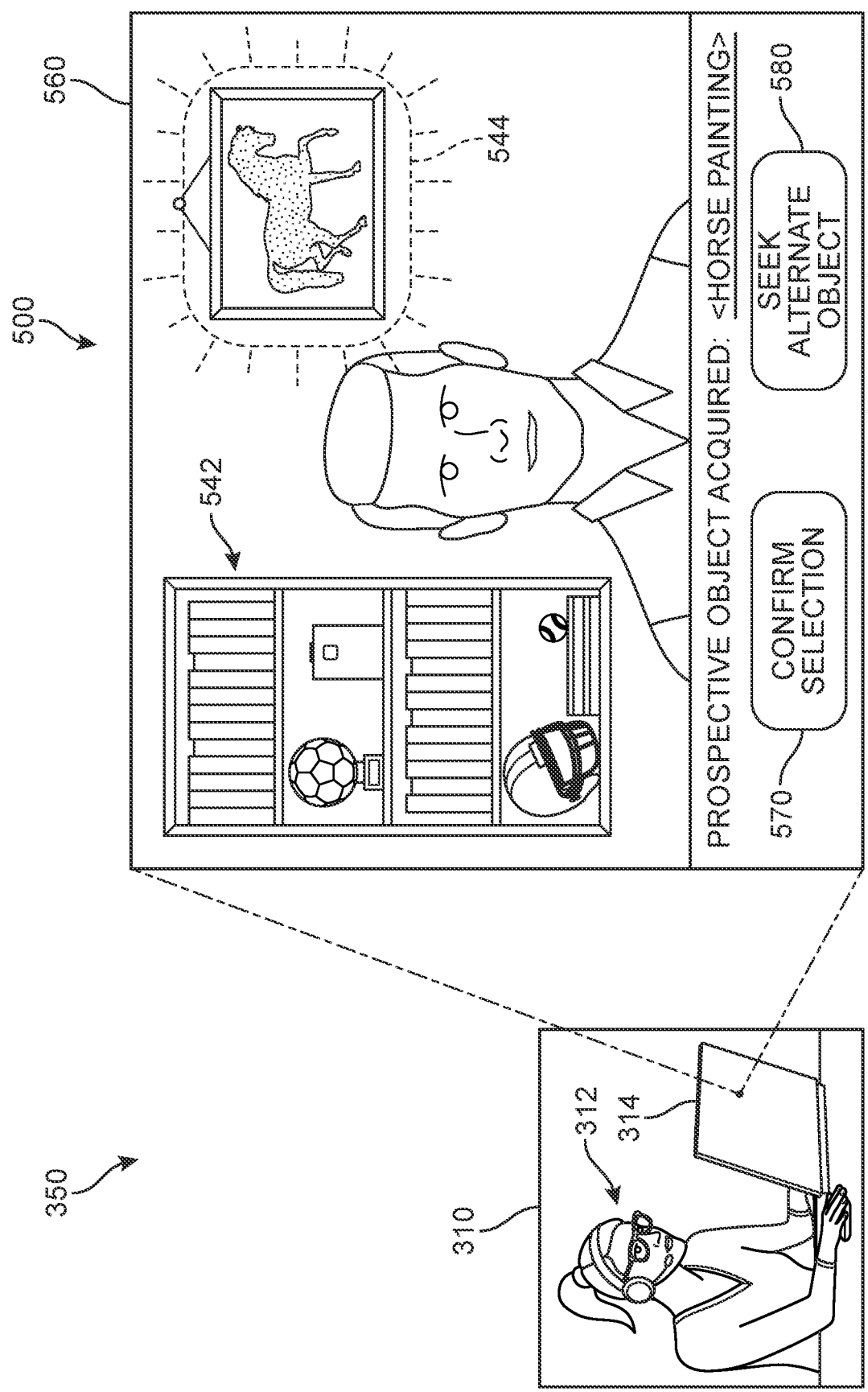
FIG. 5 depicts an example of image data corresponding to the real-world environment associated with the user of FIG. 3, and a selection of an object token, according to an embodiment.

In different embodiments, the image data that will be collected during subsequent authentication sessions are processed in a similar manner to extract the same set(s) of features which can then be matched with the feature sets stored in the database during the enrollment session 350. In FIGS. 4 and 5, one example of a possible process by which the feature sets collected during enrollment and training session(s) and subsequent authentication sessions can be processed and classified is presented simply for purposes of illustration. In FIG. 4, a first view 410 of the second physical space 360 as viewed by the camera 370 of FIG. 3 is depicted. The first view 410 includes images representing the second user 340, as well as assorted objects disposed in the room behind second user 340, such as a bookcase 442 and a painting 444. The first view 410 is captured by the camera and transmitted over network 320 to the fourth device 314 for processing by the access management system and review by second agent 312. The captured view is presented as a first image 500 in FIG. 5. It should be understood that while static images are illustrated in the drawings for purposes of simplicity, in other embodiments, the image processing can draw on data collected from real-time video of the user and his or her environment. In other words, the image data used to classify any object tokens can be static or dynamic.

As shown in FIG. 5, first image 500 includes an automatic detection and tagging of one or more potential object tokens visible around or in proximity to the second user. In this case, the system automatically selects the painting as a second object token ("second object") 544 and highlights or otherwise visually indicates such a selection for review by second agent 312 and/or second user 340 (see FIG. 6). In other words, the system automatically determines that the second object 544 represents the optimal or 'best-fit' object for purposes of authentication. In other embodiments, multiple potential object tokens may be identified and presented as prospective candidates, for final selection by second agent 312 and/or second user 340. For example, the bookcase can be tagged as a prospective candidate 542 and the system can be configured to await instructions from an agent or user before assigning the object token label to one of the objects. In still other embodiments, the system may identify a first choice but present alternate choices upon the request of a user or agent. In one embodiment, the user or agent may tap the portion of the screen corresponding to a different object to request that a specific object be recognized as the object token. In some embodiments, the agent can ask the user to move around the room or other physical space until the user is near an object that appears to have a relatively stable pose and is clearly and readily visible to the camera, and ask that the user if the visible object can be used as the token object. If so, the camera may capture the image and the object selected for use as the token object.

In FIG. 5, the second agent 312 is able to view the first image 500 as well as the prospective candidate of second object 544 via her own system administrator application interface ("administrator interface") 560. In this example, administrator interface 560 allows the second agent 312 to add a label to the selected object ("Prospective Object Acquired: <Horse Painting>") and offers selectable options for proceeding, such as a first option 570 ("Confirm Selection") and a second option ("Seek Alternate Object") 580. The label "Horse Painting" in this case can be automatically applied following recognition of the object and type of object by the intelligent system (for review by the user or agent), or typed or otherwise directly inputted by the user or agent. These options are shown for illustrative purposes only, and any other options may also be offered. While the options are shown to the second agent 312 in this example, in other embodiments, the image and options may also be shown directly to the second user 340.

Figure 6:
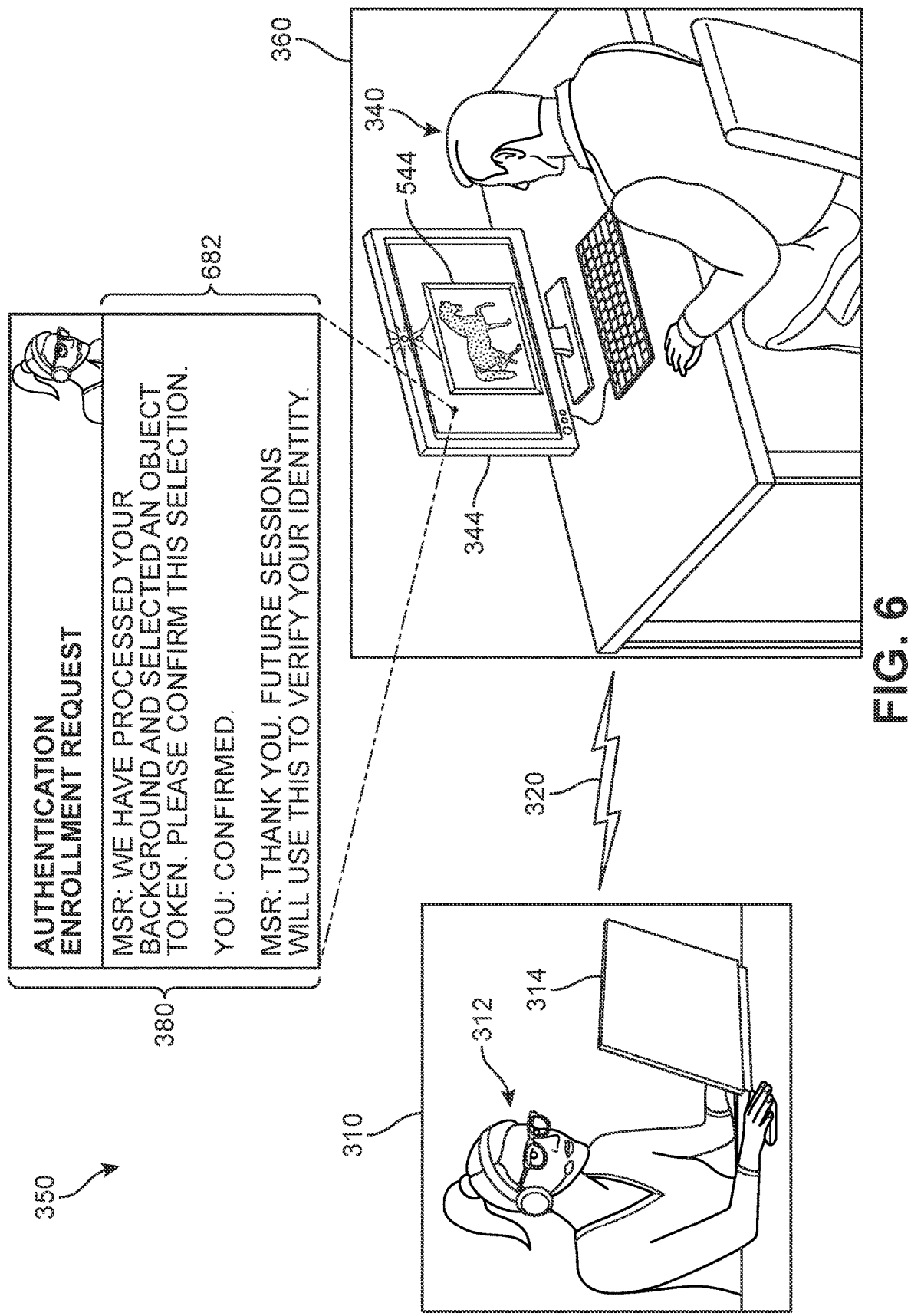
FIG. 6 depicts an example of a completion of an enrollment session for the authentication system, according to an embodiment.

In FIG. 6, the second agent 312 proceeds with the second object 544 as the prospective object token and communicates this selection to the second user 340 via a second chat window 682 of the first interface 380 ("Authentication Enrollment Request—MSR: We have processed your background and selected an object token. Please confirm this selection/YOU: Confirmed/MSR: Thank you. Future sessions will use this to verify your identity") along with a presentation of the selected token object candidate, here shown as second object 544. Once the second user 340 confirms the selection, the enrollment process is complete, and the second object 544 securely stored by the system and linked to the second user's account for reference by the system during subsequent access attempts by the second user.

While only one enrollment sequence is shown here, it can be appreciated that in different embodiments, the second user 340 may opt to register multiple object tokens with his account. For example, he may have one object token saved for when he is at home, a second object token saved for when he is at work, a third object token saved for when he is in his vehicle, etc. The user can identify the location in which he is calling or otherwise submitting his access request from, and the system can determine whether the object token being detected is the correct one for that location. In addition, in different embodiments, the user may opt to provide training data updates at different intervals. For example, the user may move residences or change jobs, or experience some other change that may affect the validity of the object token previously stored, and therefore he may request to submit new training data. In other cases, the merchant or other authentication entity may require or recommend that participants provide new training data twice a year, once a month, or at other less or more frequent intervals to ensure the object token that is stored is up-to-date. In one embodiment, the object token can be associated with an expiration date or period of time after which the participant will be required to provide new (current) image data. In some embodiments, an account for the customer verifying their identification credentials can also be linked to the customer's object token at or around that time. Thus, a verification process may occur in conjunction with the collection of the initial image data, whereby the participant presents identity documents that can be used to confirm the user's identity. The user identity can then be linked to the object token in the record. In some embodiments, the object token(s) and/or account can be further linked to the customer's credit and/or payment details that can facilitate or even automate various retail merchandise transaction processes. In addition, in some embodiments, the record or user account may identify an authorization type or level that the customer is to be granted. For example, the customer may be authorized to access only some portion of the secured resource, depending on the object token that is presented to the system. This can allow the user to, for example, access some resources while traveling, and the full array of resources when in a more secure location such as their own home.

Figure 9:
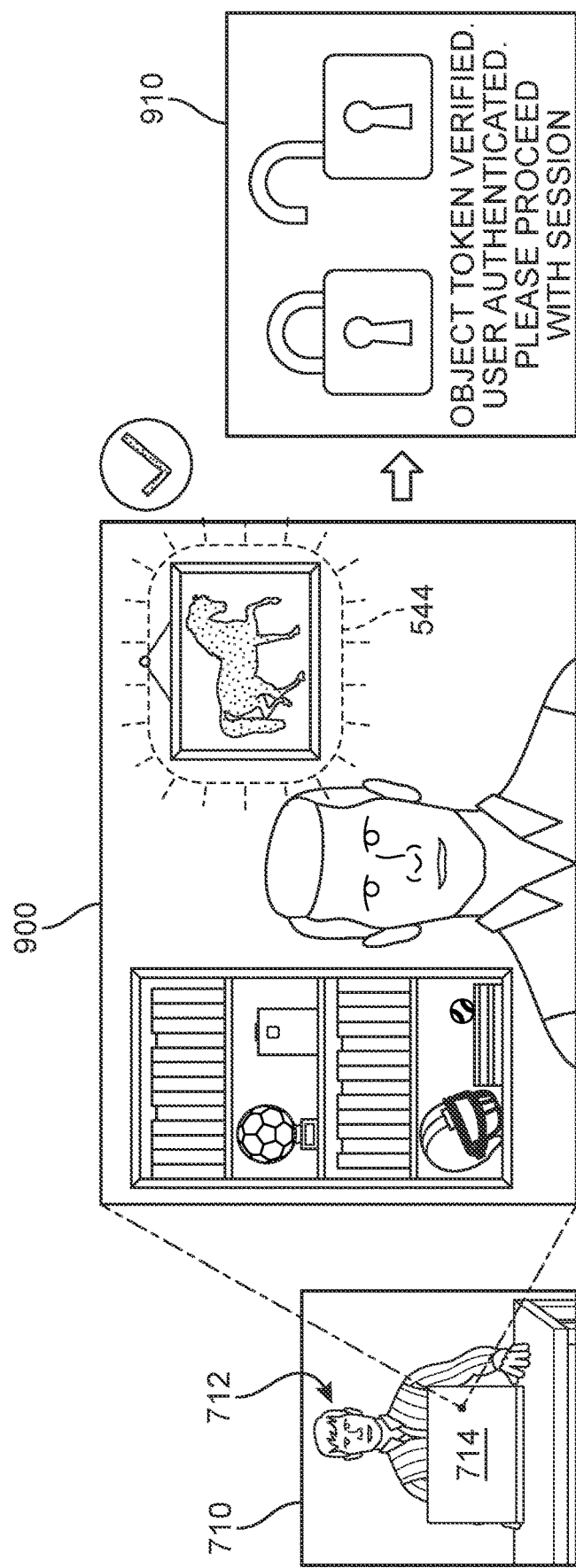
FIG. 9 depicts an example of image data corresponding to the real-world environment associated with the person of FIG. 7, and a system determination that the image data includes the correct object token, according to an embodiment.

For purposes of illustration, an example of a scenario in which an embodiment of the proposed systems may be implemented is shown with reference to FIGS. 7-9. In FIG. 7, a third agent 712 located at a remote site 710 is engaged, via a fifth computing device ("fifth device") 714, in a video communications session ("session") with the second user 340. It can be understood that for purposes of this example, the second user 340 is the same user of FIGS. 3-6 for whom enrollment in the access management system has already occurred, while the third agent 712 may be any person or virtual agent associated with the secured resource. The second user 340 is participating in the session via a sixth computing device ("sixth device") 750, which in this case is a mobile phone. The session is occurring at a time subsequent to the enrollment stage described earlier. In other words, second user 340 has previously participated in a training data collection session with the goal of enrolling or registering himself in this particular authentication technique, and the object token that was acquired at that time is stored in a record in a database accessible by the depicted authentication system.

During the session, the second user 340 requests access to or actions dependent on sensitive or otherwise secured information associated with his account. In order to proceed, the access management system requires the second user 340 be authenticated. The second user 340 can receive a reminder or other message via sixth device 750 that his designated object token will now be detected. Because second user 340 is currently located in a third physical space 760 that differs from second physical space 360 of FIG. 3 where he had previously enrolled in the authentication system, the second user 340 may realize he must now physically move to the correct location and do so (see FIG. 8). In other embodiments, the system may attempt to detect the appropriate object token at the user's current location via an image sensor of sixth device 750, and upon sensing only assorted objects 740 that fail to match the stored object token, can generate a message indicating a failed authentication attempt. The user can then respond by requesting a second attempt following his relocating to the correct space.

In FIG. 8, the second user 340 has returned to second physical space 360 that includes previously described objects such as bookcase 442 and painting 444. Second user 340 assumes a position with sixth device 750 that provides a similar perspective to the previous enrollment session to the camera of sixth device 750. In FIG. 9, a second image 900 is received by the system in which the second object 544 is visible. The system detects second object 544, determines the second object 544 matches the image data for second object 544 previously collected, and automatically authenticates the user and releases the corresponding secured resource based on this verification 910. The second user 340 can enjoy the convenience of a physical token that is expected to be readily available and known only to him, and increased confidence in the experience of a secure access session that cannot be 'copied' by impersonation of the user's face (e.g., using deep fake technology) or based on knowledge stolen by identity theft. In other embodiments, the second user 340 may add other authorized users such as family members or colleagues that can be permitted to some or all of a secured resource upon detection of the same object token.

For purposes of clarity, an alternative embodiment is presented with reference to FIG. 10. In FIG. 10, a third user 1040 is shown participating in a video conference ("conference") with a fourth agent 1012 located at a remote site 1010 over network 1020. The fourth agent 1012 may be able to access information about the third user's current location that may serve as another level of security for the user's selected type of object token. For example, the fourth agent 1012 may, via an application 1014 provided by the access management system, determine that the third user 1040 is presently in their residence which is located in a region currently experiencing rainfall. The fourth agent 1012 asks third user 1040 to orient their seventh computing device ("seventh device") 1050 toward a particular window that was previously registered as the object token for this user. In order for the third user 1040 to be authenticated, the correct object token (here, window 1060) must be detected and match the previously stored image data collected for the designated object token. However, in addition to this first-level verification, a second-level verification may be required in which the scene that is visible through the window 1060 must also present some cue that aligns with the information available about the external environment of the user's home. In other words, real-time data regarding the weather, time of day, season, etc. that may be reported or known for the user's location will need to match to a reasonable extent what is visible through window 1060 (e.g., in this case, rain can be seen falling outside window 1060). In other examples, a tree may offer the necessary visual cue—if the tree is green when it should be leafless during an access session occurring in winter, the system may flag the access attempt as a potential fraudulent attempt. In another example, a thermometer visible through the window may indicate a temperature that does not correspond to or is in an expected range for the location and date.

Figure 11:
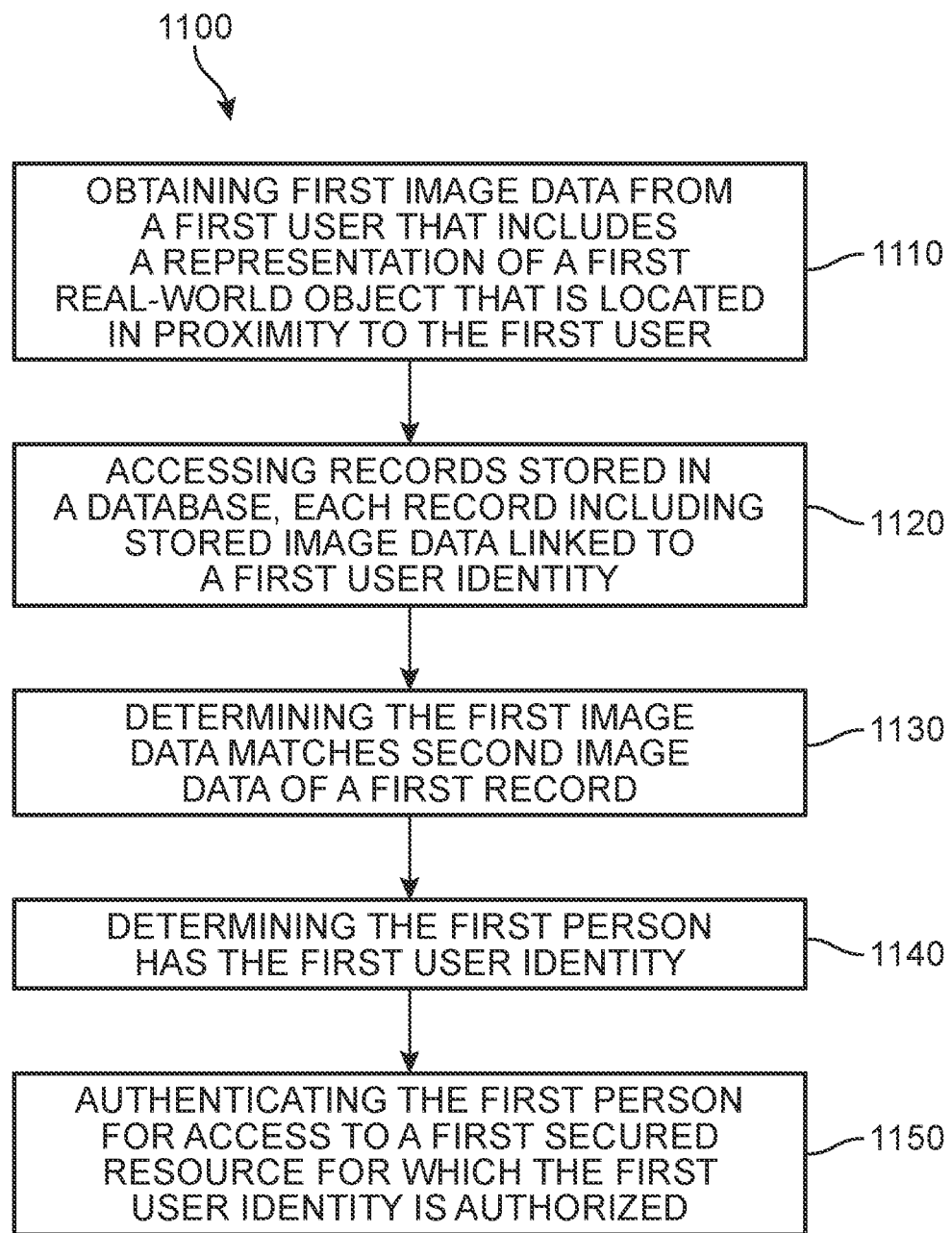
FIG. 11 is a flow chart depicting a process of authenticating a user using real-world objects, according to an embodiment.

FIG. 11 is a flow chart illustrating an embodiment of a method 1100 of authenticating an identity of an individual. The method 1100 includes a first step 1110 of obtaining first image data at a first time from a first computing device associated with a first user. The first image data includes or corresponds to a virtual representation of a first real-world object that is located in proximity to the first user. The method 1100 also includes a second step 1120 of accessing a first set of one or more records stored in a database, where each record of the first set includes stored image data linked to a first user identity. A third step 1130 includes determining that the first image data matches second image data of a first record of the plurality of records, where the second image data is linked to the first user identity. Finally, a fourth step 1140 includes determining, in response to the first image data matching the second image data, that the first person has the first user identity, and thereby authenticating, in a fifth step 1150, the first person for access to a first secured resource for which the first user identity is authorized.

In other embodiments, the method may include additional steps or aspects. In some embodiments, the method also includes obtaining the second image data at a second time earlier than the first time. In this case, the second image data can include image content for the first real-world object captured by an image sensor while the first user was also physically in range of the image sensor. In another example, the method further includes steps of employing, prior to the first time, a verification process to verify that the first user is associated with the first user identity, generating the first record that links the second image data to the first user identity, and storing the first record in the database. In one embodiment, the method can further include capturing the first image data via an image sensor of the first computing device when the first user is also in range of the image sensor.

In another embodiment, the first image data is obtained during a videoconferencing session between the first user and a service representative associated with the secured resource. In one example, the secured resource includes one of a service, feature, and information for which access is restricted to one or more authorized persons. In different embodiments, the method may further include receiving third image data at a third time earlier than the second time, detecting a plurality of real-world objects that are virtually represented in the third image data, and selecting the first real-world object from the detected plurality of real-world objects in the third image data. In such cases, the method may also include generating, based on the selection of the first real-world object, the second image data, and storing the second image data in the first record of the database.

In another example, the method also includes obtaining third image data at a third time from a second computing device associated with a second user, where the third image data includes a virtual or digital representation of a second real-world object. The method then can further include steps of accessing a second set of one or more records stored in the database, where each record of the second set includes stored image data linked to the second user identity, as well as determining that the third image data matches fourth image data of a second record of the plurality of records, where the fourth image data is linked to the second user identity and first location data. In addition, the method can include receiving second location data for the second computing device, and determining the second location data matches the first location data. Finally, the method may involve determining, in response to the third image data matching the fourth image data and the second location data matching the first location data, that the second person has the second user identity, and thereby authenticating the second person for access to a second secured resource for which the second user identity is authorized.

In some other embodiments, the method further includes obtaining third image data at a third time from a second computing device associated with a second user. The third image data includes a virtual or digital representation of a second real-world object. The method also includes steps of accessing a second set of one or more records stored in the database, where each record of the second set includes stored image data linked to the second user identity, and determining that the third image data matches fourth image data of a second record of the plurality of records, where the fourth image data is linked to the second user identity and first location data. In addition, the method can then include obtaining information about current environmental conditions experienced at a locale corresponding to the first location data, and determining, based on visual cues included in the third image data, that the current environmental conditions are represented in the third image data. Furthermore, the method may then include determining, in response to the third image data matching the fourth image data and the current environmental conditions being represented in the third image data, that the second person has the second user identity, and thereby authenticating the second person for access to a second secured resource for which the second user identity is authorized.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of authenticating an identity of an individual, the method comprising:
    obtaining first image data at a first time from a first computing device associated with a first user, the first image data including a virtual representation of a real-world object that is located in proximity to the first user;
    executing an object recognition protocol to detect one or more objects in a background of the first image data, the one or more objects including the real-world object;
    receiving, from the first user, a selection of the real-world object;
    tagging, in response to the selection, the real-world object in the first image data as a verification object token;
    receiving, at a second time after the first time, a request for access by a first person to a secured resource associated with the first user;
    obtaining, in response to the request for access, second image data that includes a virtual representation of the real-world object;
    executing the object recognition protocol to detect one or more objects in a background of the second image data, the one or more objects including the real-world object;
    tagging the real-world object in the second image data as an object token;
    determining if the object token and the verification object token sufficiently match;
    determining, in response to the object token matching the verification object token, the first person is the first user; and
    thereby authenticating the first person for access to the secured resource.

2. The method of claim 1, further comprising:
    employing, prior to the first time, a verification process to verify that the first user is associated with a first user identity;
    generating a first record that links the verification object token to the first user identity; and
    storing the first record in a database.

3. The method of claim 1, further comprising capturing the first image data via an image sensor of the first computing device when the first user is also in range of the image sensor.

4. The method of claim 1, wherein the secured resource includes one of a service, feature, and information for which access is restricted to one or more authorized persons.

5. The method of claim 1, wherein the first image data is obtained during a videoconferencing session between the first user and a service representative associated with the secured resource.

6. The method of claim 1, wherein the selection of the real-world object is made by the first user.

7. The method of claim 1, wherein the selection of the real-world object is made by a virtual or human agent for a service by which access to the secured resource is managed.

8. The method of claim 1, further comprising
    receiving, at a third time before the second time, a prior request for access;
    obtaining, in response to the prior request for access, third image data;
    executing the object recognition protocol to detect one or more assorted objects in a background of the third image data;
    failing to match any of the assorted objects with the verification object token; and
    generating a message indicating a failed authentication attempt.

9. The method of claim 8, wherein the first image data was obtained at a first location, and the third image data was obtained at a second location that differs from the first location.

10. The method of claim 9, wherein the second image data was also obtained in the first location.

11. A system for authenticating an identity of an individual, the system comprising a processor and machine-readable media including instructions which, when executed by the processor, cause the processor to:
- obtain first image data at a first time from a first computing device associated with a first user, the first image data including a virtual representation of a real-world object that is located in proximity to the first user;
- execute an object recognition protocol to detect one or more objects in a background of the first image data, the one or more objects including the real-world object;
- receive, from the first user, a selection of the real-world object;
- tag, in response to the selection, the real-world object in the first image data as a verification object token;
- receive, at a second time after the first time, a request for access by a first person to a secured resource associated with the first user;
- obtain, in response to the request for access, second image data that includes a virtual representation of the real-world object;
- execute the object recognition protocol to detect one or more objects in a background of the second image data, the one or more objects including the real-world object;
- tag the real-world object in the second image data as an object token;
- determine if the object token and the verification object token sufficiently match;
- determine, in response to the object token matching the verification object token, the first person is the first user; and
- thereby authenticate the first person for access to the secured resource.

12. The system of claim 11, wherein the instructions further cause the processor to:
- employ, prior to the first time, a verification process to verify that the first user is associated with a first user identity;
- generate a first record that links the verification object token to the first user identity; and
- store the first record in a database.

13. The system of claim 11, wherein the instructions further cause the processor to capture the first image data via an image sensor of the first computing device when the first user is also in range of the image sensor.

14. The system of claim 11, wherein the secured resource includes one of a service, feature, and information for which access is restricted to one or more authorized persons.

15. The system of claim 11, wherein the first image data is obtained during a videoconferencing session between the first user and a service representative associated with the secured resource.

16. The system of claim 11, wherein the selection of the real-world object is made by the first user.

17. The system of claim 11, wherein the instructions further cause the processor to:
- receive, at a third time before the second time, a prior request for access;
- obtain, in response to the prior request for access, third image data;
- execute the object recognition protocol to detect one or more assorted objects in a background of the third image data;
- fail to match any of the assorted objects with the verification object token; and
- generate a message indicating a failed authentication attempt.

18. The system of claim 17, wherein the first image data was obtained at a first location, and the third image data was obtained at a second location that differs from the first location.

19. The system of claim 18, wherein the second image data was also obtained in the first location.

20. A system for authenticating an identity of an individual, the system comprising:
- means for obtaining first image data at a first time from a first computing device associated with a first user, the first image data including a virtual representation of a real-world object that is located in proximity to the first user;
- means for executing an object recognition protocol to detect one or more objects in a background of the first image data, the one or more objects including the real-world object;
- means for receiving, from the first user, a selection of the real-world object;
- means for tagging, in response to the selection, the real-world object in the first image data as a verification object token;
- means for receiving, at a second time after the first time, a request for access by a first person to a secured resource associated with the first user;
- means for obtaining, in response to the request for access, second image data that includes a virtual representation of the real-world object;
- means for executing the object recognition protocol to detect one or more objects in a background of the second image data, the one or more objects including the real-world object;
- means for tagging the real-world object in the second image data as an object token;
- means for determining if the object token and the verification object token sufficiently match;
- means for determining, in response to the object token matching the verification object token, the first person is the first user; and
- means for authenticating the first person for access to the secured resource.

* * * * *